(12) United States Patent
Snider

(10) Patent No.: US 11,858,411 B2
(45) Date of Patent: Jan. 2, 2024

(54) VEHICULAR REAR WINDOW ASSEMBLY WITH INTEGRATED LIGHTING

(71) Applicant: Magna Mirrors of America, Inc., Holland, MI (US)

(72) Inventor: Darin J. Snider, Holland, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 0 days.

(21) Appl. No.: 17/447,296

(22) Filed: Sep. 10, 2021

(65) Prior Publication Data

US 2022/0072992 A1    Mar. 10, 2022

Related U.S. Application Data

(60) Provisional application No. 62/706,789, filed on Sep. 10, 2020.

(51) Int. Cl.
*B60Q 1/26*  (2006.01)
*F21S 43/14* (2018.01)
*B60J 1/18*  (2006.01)

(52) U.S. Cl.
CPC ............ *B60Q 1/268* (2013.01); *B60J 1/18* (2013.01); *B60Q 1/2696* (2013.01); *F21S 43/14* (2018.01)

(58) Field of Classification Search
CPC .......... B60J 1/18; B60J 1/1853; B60Q 1/268; B60Q 1/2696; B60Q 1/302; F21S 43/14
See application file for complete search history.

(56) References Cited

U.S. PATENT DOCUMENTS

| | | |
|---|---|---|
| 4,488,141 A | 12/1984 | Ohlenforst et al. |
| 4,645,970 A | 2/1987 | Murphy |
| 4,758,931 A | 7/1988 | Gabaldon |
| 4,896,136 A | 1/1990 | Hotovy |
| 4,920,698 A | 5/1990 | Friese et al. |
| 4,995,195 A | 2/1991 | Olberding et al. |
| 5,016,145 A | 5/1991 | Singleton |

(Continued)

FOREIGN PATENT DOCUMENTS

| | | | |
|---|---|---|---|
| DE | 9114246 U1 | 2/1992 | |
| FR | 2766432 A1 * | 1/1999 | ............. B60Q 1/302 |

OTHER PUBLICATIONS

Sanchez, Dan, "Lighting Up Cap and Tonneau Sales," Trucking Times.com, Wiesner Media 2015.

*Primary Examiner* — Jason M Han
(74) *Attorney, Agent, or Firm* — HONIGMAN LLP

(57) ABSTRACT

A vehicular rear window assembly includes a window panel having an inner glass panel and an outer glass panel laminated together. A lighting device includes a plurality of light sources arranged on a circuit element. The vehicular rear window assembly is configured to be disposed at a rear portion of a cabin of a vehicle. The lighting device is disposed between the inner glass panel and the outer glass panel. The light sources, when electrically powered, emit light that is visible through the outer glass panel of the window panel so as to be viewable by a person viewing the vehicular rear window assembly from exterior and rearward of the vehicle. At least some of the light sources of the lighting device are electrically powered responsive to actuation of a brake of the vehicle to provide a center high mounting stop lamp feature that is integrated within the window panel.

30 Claims, 9 Drawing Sheets

(56) References Cited

U.S. PATENT DOCUMENTS

| | | |
|---|---|---|
| 5,050,051 A | 9/1991 | Machida et al. |
| 5,146,712 A | 9/1992 | Hlavaty |
| 5,211,466 A | 5/1993 | Jarocki et al. |
| 5,400,225 A | 3/1995 | Currie |
| 5,531,046 A | 7/1996 | Kollar et al. |
| 5,572,376 A | 11/1996 | Pace |
| 5,580,153 A | 12/1996 | Motz |
| 5,799,444 A | 9/1998 | Freimark et al. |
| 5,831,523 A | 11/1998 | Lange |
| 5,839,231 A | 11/1998 | Gebhart et al. |
| 5,996,284 A | 12/1999 | Freimark et al. |
| 6,026,611 A | 2/2000 | Ralston et al. |
| 6,086,230 A | 7/2000 | Wooldridge et al. |
| 6,119,401 A | 9/2000 | Lin et al. |
| 6,536,930 B1 | 3/2003 | Hirmer |
| 6,691,464 B2 | 2/2004 | Nestell et al. |
| 6,955,009 B2 | 10/2005 | Rasmussen |
| 7,003,916 B2 | 2/2006 | Nestell et al. |
| 7,036,965 B2 | 5/2006 | Dalton, Jr. et al. |
| 7,048,400 B2 | 5/2006 | Murasko et al. |
| 7,073,293 B2 | 7/2006 | Galer |
| 7,172,322 B2 | 2/2007 | Pommeret et al. |
| 7,347,608 B2 | 3/2008 | Emde |
| 7,575,349 B2 | 8/2009 | Bucher et al. |
| 7,642,908 B2 | 1/2010 | Mertens |
| 8,044,415 B2 * | 10/2011 | Messere ............ B32B 17/10036 362/249.02 |
| 8,047,691 B2 | 11/2011 | Leese et al. |
| 8,151,519 B2 | 4/2012 | Bello et al. |
| 8,382,350 B2 | 2/2013 | Gold |
| 8,402,695 B2 | 3/2013 | Smith et al. |
| 8,408,773 B2 | 4/2013 | Judge |
| 8,881,458 B2 | 11/2014 | Snider et al. |
| 8,882,318 B2 | 11/2014 | Pfeil et al. |
| 8,915,018 B2 | 12/2014 | Snider |
| 8,938,914 B2 | 1/2015 | Hulst et al. |
| 9,579,955 B2 | 2/2017 | Snider |
| 9,845,047 B1 * | 12/2017 | Salter ................... B60Q 1/268 |
| 9,896,026 B2 * | 2/2018 | Snider ................... B60Q 1/268 |
| 9,925,915 B2 * | 3/2018 | Bauerle ................. B60Q 3/78 |
| 9,994,144 B2 * | 6/2018 | Dellock ................. F21V 9/38 |
| 10,112,527 B2 | 10/2018 | Snider |
| 10,427,503 B2 | 10/2019 | Snider |
| 10,524,313 B2 | 12/2019 | Snider et al. |
| 10,559,153 B2 | 2/2020 | Snider et al. |
| 10,668,868 B2 | 6/2020 | Snider et al. |
| 2002/0152686 A1 | 10/2002 | Whitehead |
| 2003/0213179 A1 | 11/2003 | Galer |
| 2004/0020131 A1 | 2/2004 | Galer et al. |
| 2006/0092658 A1 | 5/2006 | Scholz |
| 2006/0107600 A1 | 5/2006 | Nestell et al. |
| 2007/0217213 A1 | 9/2007 | Chang |
| 2008/0127563 A1 | 6/2008 | Tooker |
| 2008/0155902 A1 | 7/2008 | Kaiser |
| 2010/0149826 A1 | 6/2010 | Leese et al. |
| 2014/0047772 A1 | 2/2014 | Hulst |
| 2015/0314672 A1 | 11/2015 | Lahnala |
| 2017/0356231 A1 | 12/2017 | Snider et al. |
| 2018/0079379 A1 | 3/2018 | Snider et al. |
| 2019/0383084 A1 | 12/2019 | Snider et al. |
| 2021/0296530 A1 | 9/2021 | Bailey |

* cited by examiner

VEHICULAR REAR WINDOW ASSEMBLY WITH INTEGRATED LIGHTING

CROSS REFERENCE TO RELATED APPLICATION

The present application claims the filing benefits of U.S. provisional application Ser. No. 62/706,789, filed Sep. 10, 2020, which is hereby incorporated herein by reference in its entirety.

FIELD OF THE INVENTION

The present invention relates to a rear window assembly for a vehicle and, more particularly, a rear window assembly for a pickup truck or the like.

BACKGROUND OF THE INVENTION

It is known to provide a rear slider window assembly for an opening of a vehicle, such as a rear slider window assembly for a rear opening of a pickup truck. Conventional slider window assemblies for rear openings of trucks or the like typically include three or more panels, such as two fixed window panels and a slidable window panel. The slidable window panel is supported by rails and may be moved along the rails to open and close the window. The slidable window panel may be driven or moved by a cable drive system, such as described in U.S. Pat. No. 8,151,519, which is hereby incorporated herein by reference in its entirety.

SUMMARY OF THE INVENTION

A rear window assembly includes a lighting device having one or more strips or rows of light sources, such as a plurality of light emitting diodes (LEDs), such as micro-LEDs, disposed within the fixed glass window panel of the window assembly (between two glass window panels that are laminated together to form the fixed glass window panel) so as to provide a flush glass window assembly with lighting viewable through the fixed glass window panel. The light sources may comprise red light-emitting sources for a center high mounted stop lamp (CHMSL) of the vehicle and/or may comprise white light-emitting (or other color) light sources for a truck bed illumination function and/or may comprise white light-emitting (or other color) light sources for an interior cabin illumination function and/or or the like. The lighting device is electrically connected to a wiring harness or circuitry or user input of the vehicle when the window assembly is installed or mounted at the vehicle.

These and other objects, advantages, purposes and features of the present invention will become apparent upon review of the following specification in conjunction with the drawings.

DESCRIPTION OF THE PREFERRED EMBODIMENTS

Figure 1:
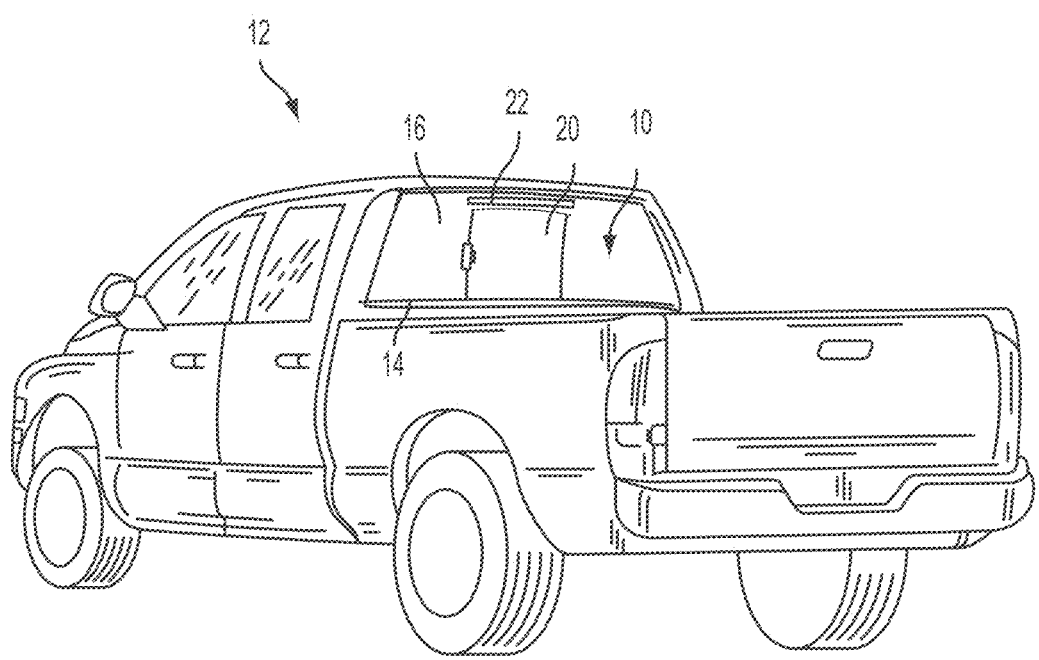
FIG. 1 is a rear perspective view of a pickup truck having a rear slider window assembly.
Figure 2:
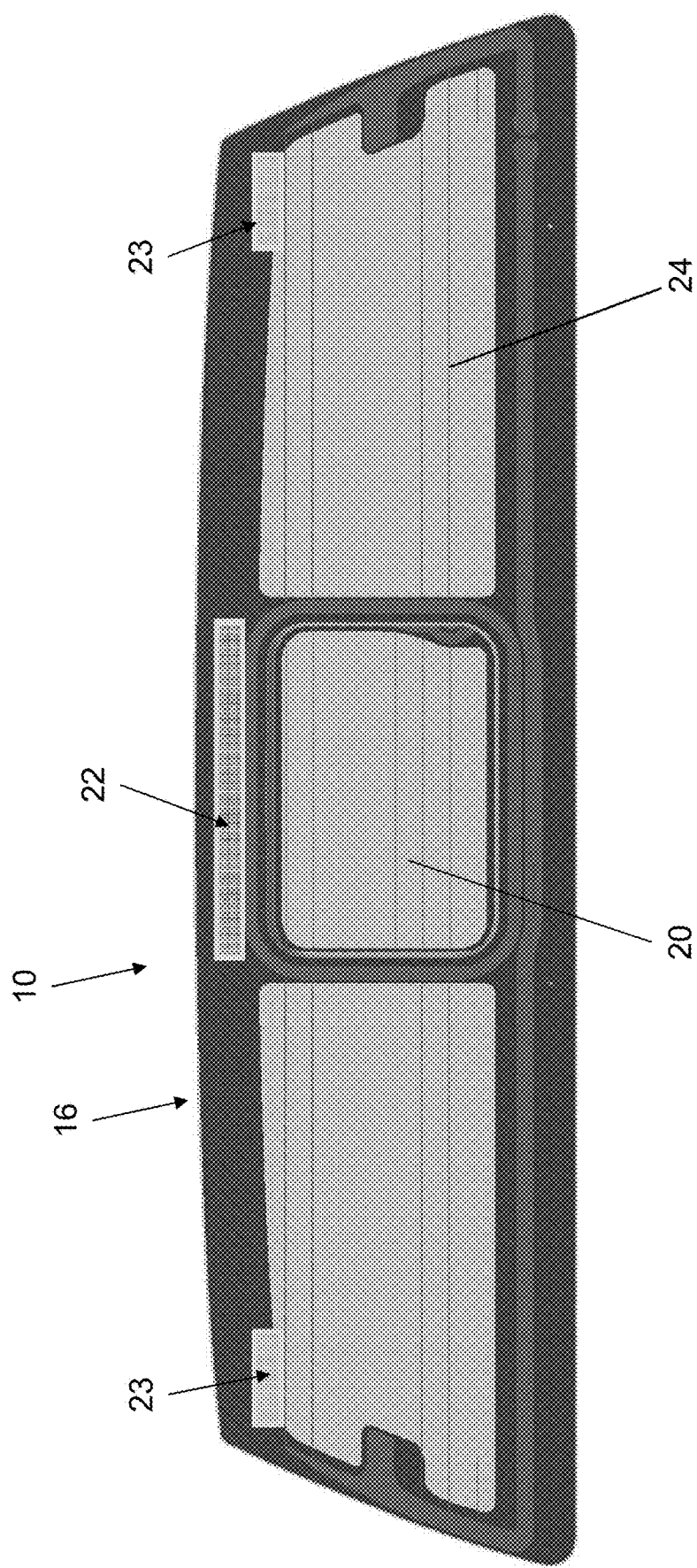
FIG. 2 is a front plan view of the rear slider window assembly, shown with a single fixed window panel and a lighting device.
Figure 3:
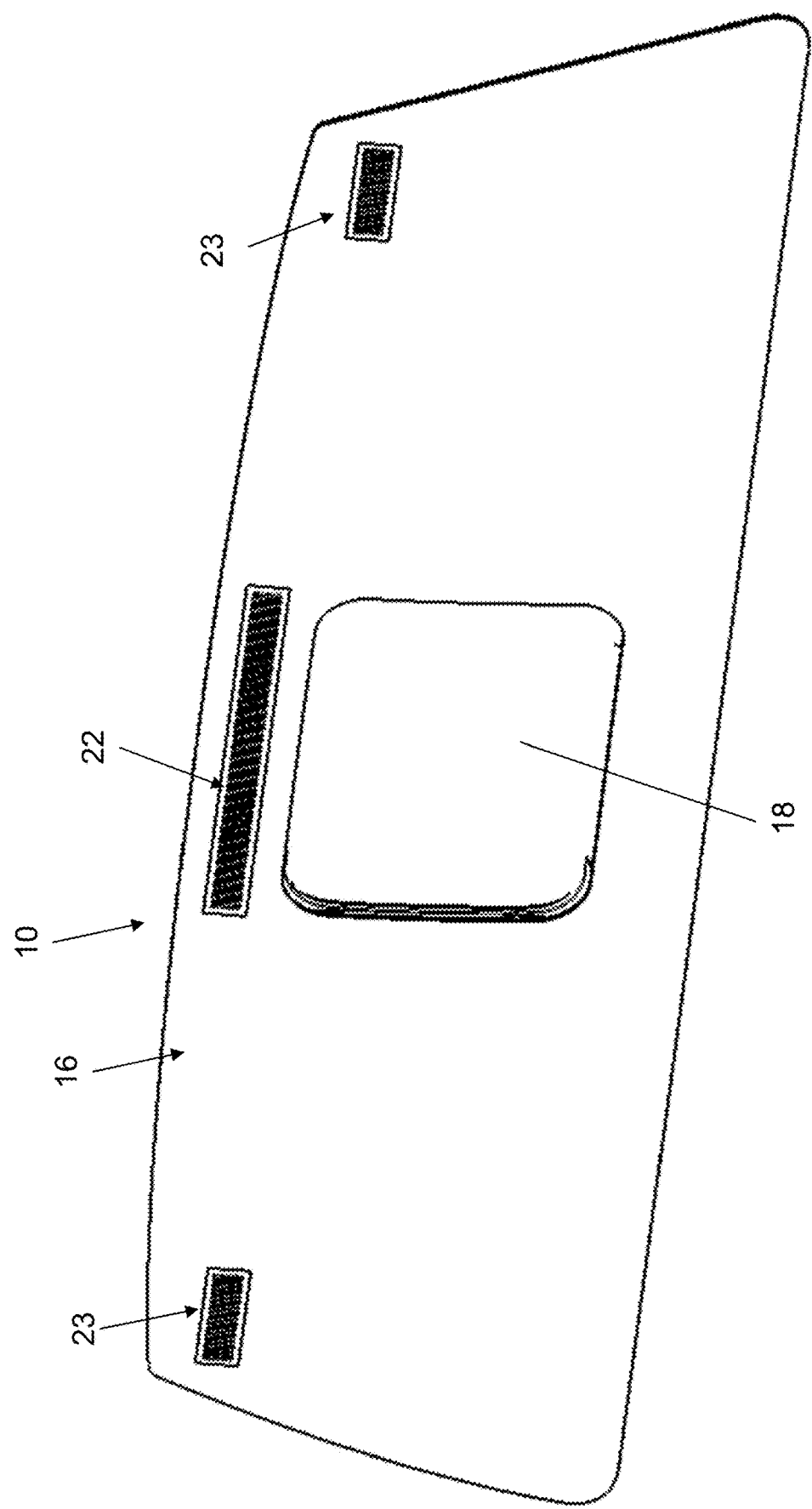
FIG. 3 is a rear perspective view of the fixed window panel of the rear slider window assembly.

Referring now to the drawings and the illustrative embodiments depicted therein, a rear slider window assembly 10 of a vehicle 12 (such as a pickup truck or the like) includes a window frame 14, a fixed window panel 16 having an aperture 18 that separates side window portions and a movable window panel 20 that is movable relative to the window frame 14 and the fixed window panel 16 between an opened position and a closed position (FIGS. 1-3). The window assembly 10 includes a lighting system having a lighting device 22 disposed within the glass window panel 16 and above and along a center region of an upper rail of the frame 14. The lighting device 22, when activated, emits light that is viewable through the window panel 16. The lighting device 22 may comprise a center high mounted stop lamp (CHMSL) for the vehicle whereby the lighting system may actuate the lighting device 22 as part of a brake light system of the vehicle 12, or the lighting device 22 may comprise a plurality of white light emitting lights whereby the lighting system may actuate the lighting device 22 as part of a truck bed illumination system, or the lighting device 22 may comprise a plurality of white light emitting lights whereby the lighting system may actuate the lighting device as part of an interior cabin illumination system or the like, as discussed below. Thus, the lighting device 22, when activated, may emit light visible through the window panel 16 and viewable at the exterior of the vehicle and/or at the interior of the vehicle. Optionally, the emitted light may illuminate an exterior portion of the vehicle and/or an interior portion of the cabin of the vehicle.

The lighting device is disposed within the glass panel 16 and laminated between an inner glass panel 16a and an outer glass panel 16b (FIG. 4A), which are laminated together to form the window panel 16. The lighting device 22, when energized, emits light that passes through the outer glass panel 16b, such as through a darkened portion of the panel or through apertures or windows formed through a darkened portion of the panel or the like, as also discussed below. In a similar manner, and as discussed further below, the lighting device 22, when energized, may emit light that passes through the inner glass panel 16a. The lighting device and window assembly may utilize aspects of the lighting devices and window assemblies described in U.S. Pat. Nos. 10,668,868 and/or 9,896,026, which are hereby incorporated herein by reference in their entireties.

In the illustrated embodiment, the window assembly 10 comprises a hole-in-glass window configuration, where a single fixed glass panel 16 has an aperture or hole or opening 18 established therethrough to define separate spaced apart fixed window panels or panel portions, such as in a similar manner as the window assemblies described in U.S. Pat. No. 8,881,458, which is hereby incorporated herein by reference in its entirety. Optionally, the window assembly may include two fixed window panels that are spaced apart so as to define an opening 18 therebetween. The fixed window panels may comprise two separate spaced apart fixed window panels that define the opening 18 therebetween (and with upper and lower appliqués or trim or filler panels or elements disposed at the upper and lower regions of the opening 18 and between the fixed window panels, and optionally with the lighting device 22 disposed within or laminated within the upper appliqué or the like).

The frame 14 comprises an upper rail and a lower rail, with the upper and lower edge regions of movable window panel 20 movably or slidably received in and along the respective upper and lower rails. The slider or movable window panel 20 is movable along the lower rail and upper rail of the frame portion 14 to open and close the aperture or opening 18, such as in a manner similar to known slider window assemblies. The slider window panel 20 may be disposed at a lower carrier, which may receive the lower perimeter edge region of the slider window panel 20 therein and may be slidably or movably received in the channel portion of the lower rail of the frame portion 14. The upper rail may comprise any suitable channel or rail element configured to slidably receive an upper edge portion of the movable window panel 20, and the upper rail may comprise a unitarily formed upper rail or channel.

Figure 4:
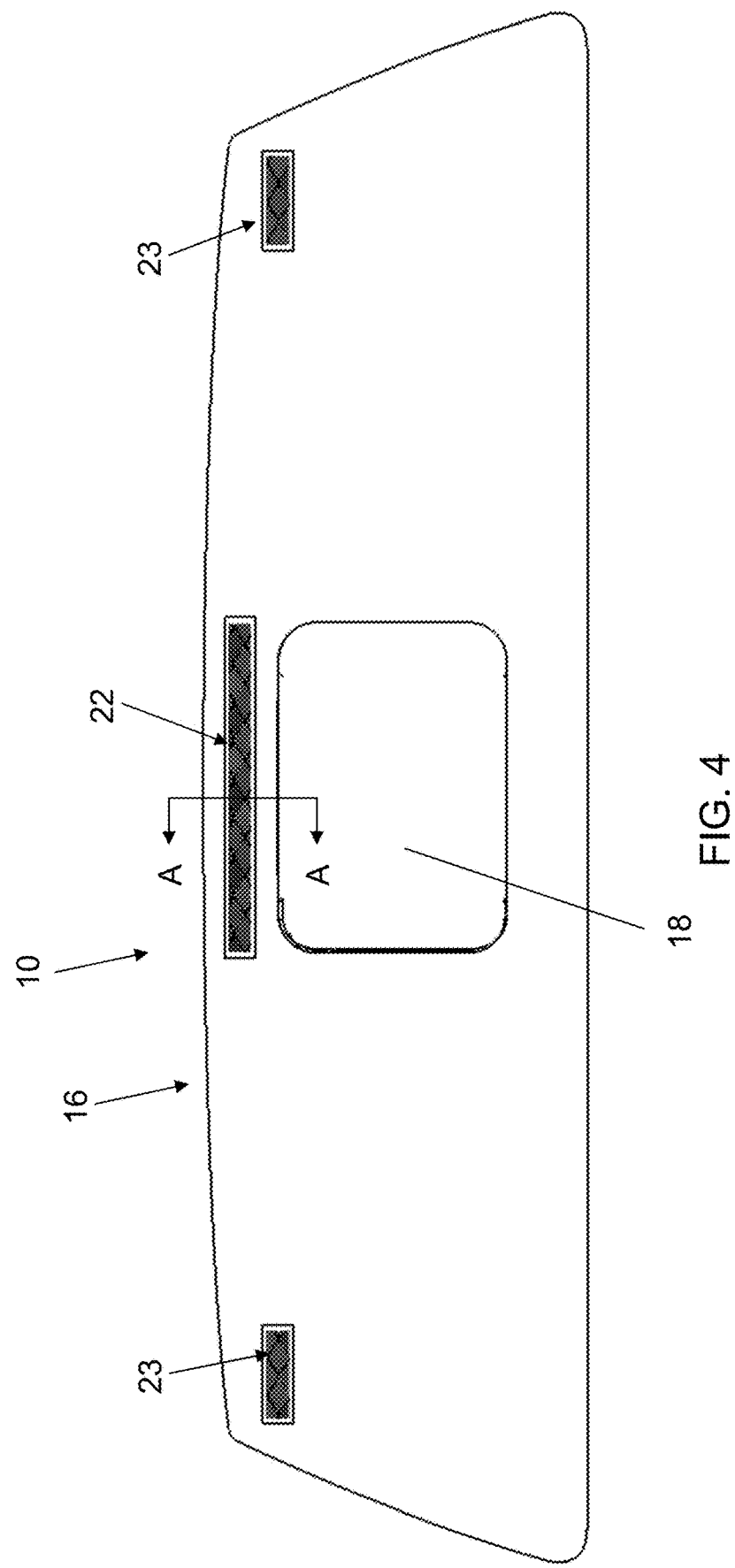
FIG. 4 is a rear plan view of the fixed window panel of the rear slider window assembly.
Figure 4A:
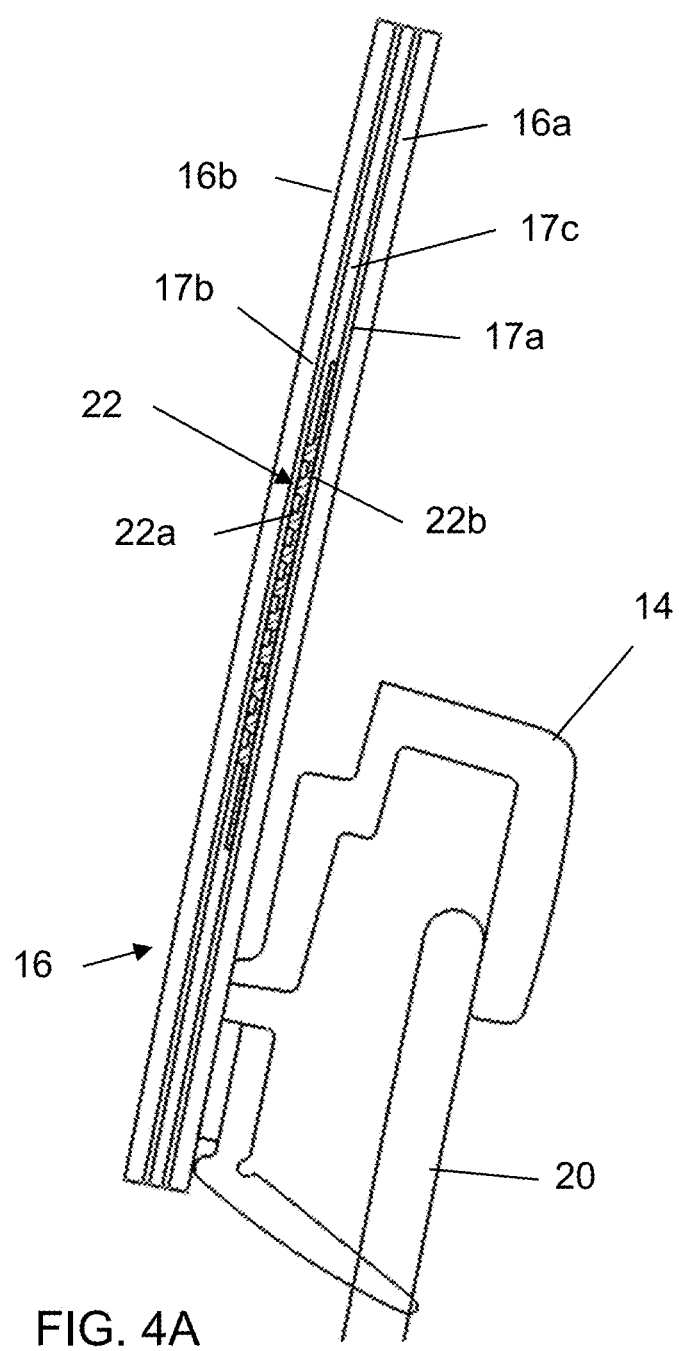
FIG. 4A is a sectional view of the fixed window panel taken along the line A-A in FIG. 4.
Figure 5:
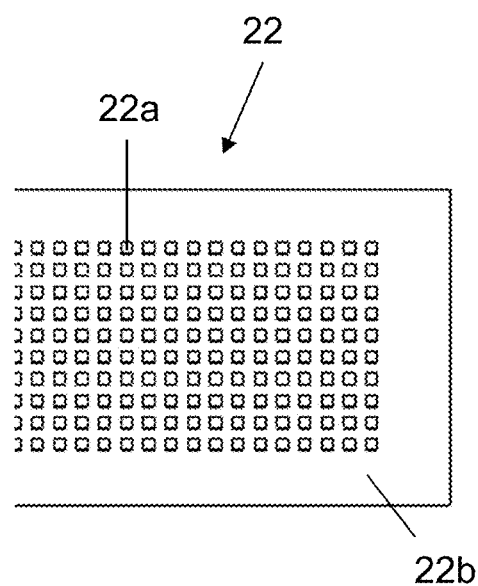
FIG. 5 is an enlarged plan view of a portion of the lighting device.
Figure 6:
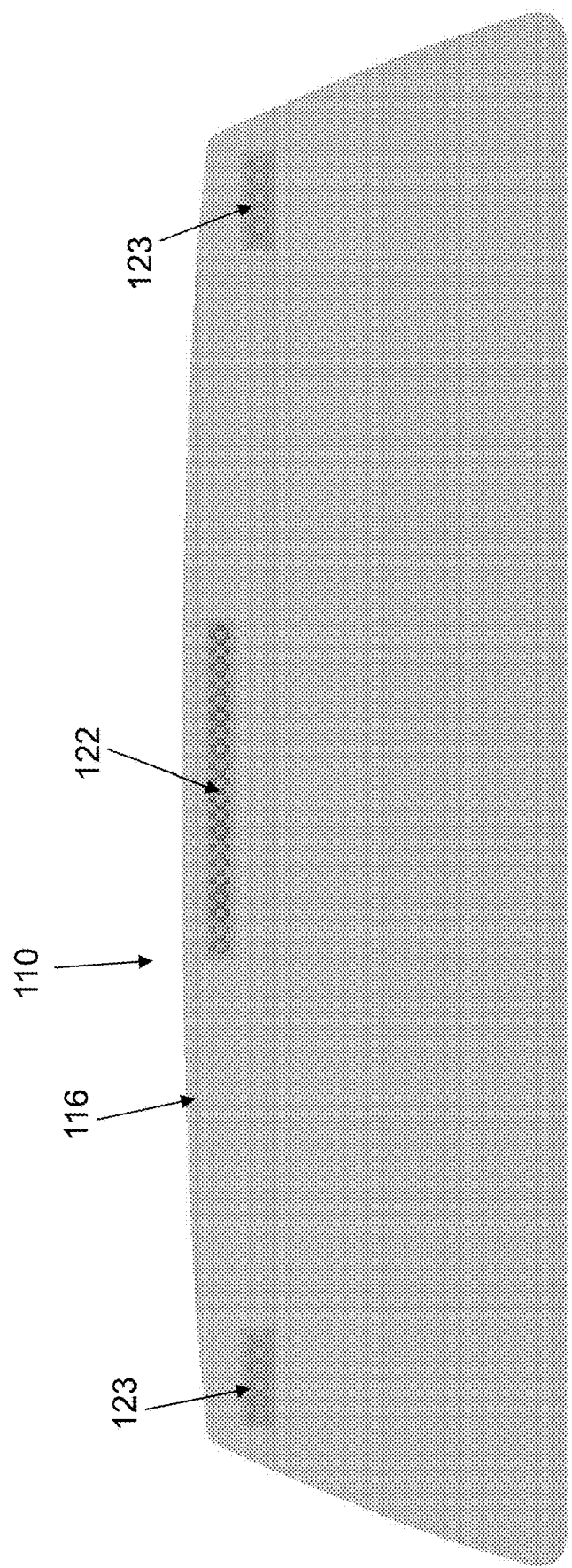
FIG. 6 is a front plan view of a fixed window panel and lighting device of a rear window assembly for a vehicle.
Figure 7:
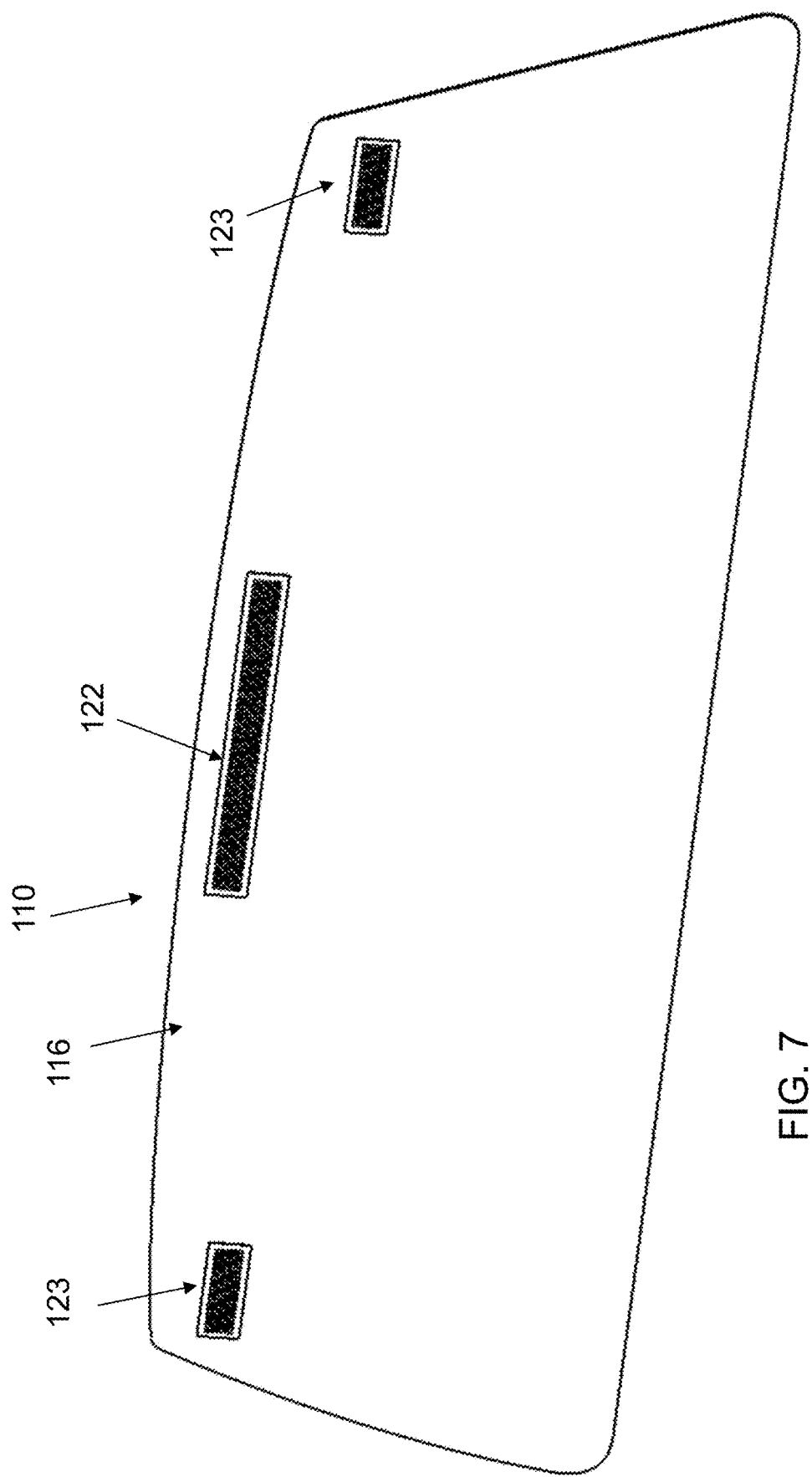
FIG. 7 is a rear perspective view of the fixed window panel and lighting device of the rear window assembly.

As shown in FIGS. 2-5, the lighting device 22 comprises a plurality of individual light sources 22a (FIG. 5), such as light emitting diodes (LEDs), such as micro-LEDs, or such as organic light emitting diodes (OLEDs), or such as electro-luminescent light sources, or the like, arranged in a two dimensional array of rows and columns at an upper center region of the fixed window panel (such as above the opening or aperture 18 through the window panel 16). As shown in FIG. 4A, the laminated window panel 16 comprises the inner glass panel 16a and the outer glass panel 16b, with respective interlayers of polyvinyl butyral (PVB) 17a, 17b disposed at the inner opposing surfaces of the glass panels 16a, 16b, and with a central layer 17c disposed between the interlayers 17a, 17b. As can be seen with reference to FIGS. 4A and 5, the individual light sources 22a may be arranged on a sheet 22b (such as a thin flexible circuit element or tape) that is disposed at or attached or adhered at the PVB layer 17a at the surface of the inner glass panel 16a, with the individual light sources 22a disposed between the panels 16a, 16b (and with the interlayer 17c conforming to the lighting device 22 between the interlayers 17a, 17b) so that light emitted by the light sources 22a passes through the outer glass panel 16b and/or inner glass panel 16a.

The lighting device may be disposed at an upper central region of the window panel 16, and may be at a location where one of the glass panels 16a, 16b has a non-light-transmitting layer (such as a ceramic frit layer or the like) established at a surface thereof. The lighting device 22 includes an electrical lead or wire or conductive trace that extends between the adjacent PVB layers and laminated glass panels and extends from the window assembly 10 for electrical connection to a vehicle wire harness when the window assembly 10 is installed at a vehicle 12. For example, the surface of the inner glass panel 16a may have electrically conductive traces established thereat, whereby electrical connection of the lighting device 22 to the electrically conductive traces is made when the lighting device 22 is disposed at the glass panel, with the electrically conductive traces extending along the glass panel to a perimeter region of the window panel 16 for electrical connection to a vehicle wire harness or the like. The lighting device may utilize aspects of the lighting devices described in U.S. Pat. Nos. 10,559,153 and/or 10,427,503, and/or U.S. patent application Ser. No. 17/249,879, filed Mar. 17, 2021, which are hereby incorporated herein by reference in their entireties.

The lighting device 22 is integrated in the window panel 16, such that the window panel 16 (with lighting device integrated therein) is installed at the vehicle as a unit, whereby the lighting device 22 is electrically connected to a vehicle wire harness or the like for power and control (such as by an electronic control module or the like of the vehicle at which the window assembly is installed). When the lighting device 22 is not activated, the lighting device 22 is covert and not readily discernible at the window panel 16 (due to the tint or darkening of the window panel (such as due to tinting of one or more of the PVB layers or due to a non-light transmitting layer) or due to a transparent characteristic of the lighting element itself when it is not energized). Optionally, one or more of the PVB interlayers may be tinted or darkened (e.g., to provide a tinted window) except at the location where the light sources are disposed, with that portion of the PVB interlayer or interlayers (where the light sources are disposed) comprising a transparent or clear or lightly tinted or translucent interlayer so that light emitted by the light sources 22a passes through the interlayer and is viewable by a person viewing the rear window assembly. By avoiding use of a darkened or tinted material at the light sources 22a, reduced power light sources may be used since they do not have to emit light through a darkened or tinted panel or layer. Optionally, when the lighting device 22 is configured to emit light exterior the vehicle, the inner PVB interlayer may be tinted and the outer PVB interlayer may be transparent such that the window is tinted or darkened and light emitted by the light sources 22aa of the lighting device 22 passes through the non-tinted outer PVB interlayer (while the tinted inner PVB interlayer assists in concealing or rendering covert the lighting device when it is not electrically powered). In a similar manner, when the lighting device 22 is configured to emit light interior the vehicle, the inner PVB layer may be transparent and the outer PVB layer may be tinted.

In the illustrated embodiment, the lighting device 22 is disposed within the fixed panel 16 and above and partially along the upper rail. The lighting device 22, when actuated or energized, emits light through the outer window panel 16b so as to be viewable to a person viewing the vehicle from behind the vehicle. The light sources 22a may emit sufficient light so as to be viewable through an opaque or semi-opaque layer at the window panel 16 or the light sources 22a may be disposed at and generally aligned with apertures through the opaque or semi-opaque layer at the window panel 16, such that the light emitted by the light sources 22a of the lighting device 22 passes through the outer glass panel 16b of the fixed window panel 16 so as to be readily viewable by a person viewing the exterior of the window assembly 10 from exterior and rearward of the vehicle.

In the illustrated embodiment, the lighting device 22 comprises an array of individual light sources 22a (such as a plurality of LEDs or OLEDs or electro-luminescent light sources or the like) arranged along the strip or circuit element 22b that extends along and above the aperture 18 of the fixed panel 16. The lighting device 22 may comprise an ultra-thin device having a plurality of micro-LEDs arranged to provide the desired lighting pattern. For example, the light sources 22a may comprise red light-emitting LEDs (or the light sources may be white light-emitting LEDs and the outer glass panel may be red colored so as to provide red illumination) such that the lighting device 22 comprises a CHMSL and is actuated with the brake lights of the vehicle.

The lighting device 22 may be electrically connected to a wiring harness of the vehicle 12 and/or circuitry of the vehicle 12 (such as brake light wiring or circuitry and/or such as a user input and a power source and/or the like) via any suitable means. For example, the lighting device 22 may electrically connect to a connector and electrically conductive trace established at the inner surface of the fixed window panel 16, whereby a wiring harness or wire of the vehicle may electrically connect to the connector at the window panel 16. Optionally, the lighting device 22 may electrically connect to a conductive trace or busbar that extends along the fixed window panel 16 to a connector at a side or lower region of the window assembly 10, whereby a wiring harness may connect to the connector and to connectors for a heater grid 24 of the window assembly 10 at a common connecting area of the window assembly 10. Optionally, the lighting device 22 may include a wire or lead that extends from the device and may be routed along or behind the upper rail for electrical connection to a wiring harness or wire of the vehicle 12.

Optionally, the lighting device 22 may provide both a brake light function and a truck bed illumination function. For example, the lighting device 22 may include a plurality of red light-emitting LEDs or the like at a center region of the window assembly 10 and a plurality of white light-emitting LEDs or the like, such as at the center region of the window assembly and outboard of the red light-emitting LEDs or in another suitable position along the perimeter of the fixed window panel 16, to provide truck bed illumination. In the illustrated embodiment, the lighting device 22 disposed at the center region may comprise a plurality of red light-emitting LEDs and additional lighting devices 23 at the upper corner or side regions of the window assembly 10 along or at or near the perimeter of the window panel 16 may comprise white light-emitting LEDs to provide the truck bed lighting function. The lighting device 22 thus may have the center or red lights electrically connected to the brake light circuitry and the side lighting device 23 provides side or white lights electrically connected to a user input in the cabin of the vehicle or at the window assembly, whereby actuation of the user input actuates the side lighting device 23 for illuminating the truck bed (with the side lights directing illumination rearward of the cab of the vehicle and preferably downward so as to illuminate the truck bed). Optionally, the lighting devices 23 may provide a turn signal indicator function, such as by emitting light responsive to actuation of a turn signal of the vehicle 12. The lighting device 23 may otherwise be substantially similar to the lighting device 22, discussed above, such that a detailed discussion of the lighting devices need not be repeated herein.

Optionally, although shown and described as having light sources that emit light through the outer glass panel 16*b* and thus in a rearward direction with respect to the vehicle, the window assembly 10 may have an integrated lighting device that includes light sources that are directed forwardly and through the inner glass panel 16*a* and towards and into the interior cabin of the vehicle 12. For example, the lighting device 22 may include light sources (e.g., LEDs or OLEDs or electro-luminescent light sources or the like) that are disposed at the other side of the circuit element 22*b* or otherwise configured to emit light forward through the inner glass panel 16*a*, with the inner glass panel optionally having an aperture or transparent portion (that may correspond with an aperture or opening at the headliner of the vehicle), such that light emitted by the interior lighting device light sources may illuminate at least a portion of the interior cabin of the vehicle.

The interior lighting function may provide illumination of the cabin or may provide a more directed or focused lighting function, such as for a reading light or the like for a passenger sitting in a rear seat of the vehicle 12. The interior lighting function may be provided via one or more lighting devices, such as one at or near one or both of the upper corner regions of the window assembly 10, such that light emitted by the light sources is not at a central region that may reflect off of the interior rearview mirror to cause glare to the driver of the vehicle. For example, the interior lighting function may be provided by lighting sources disposed on an interior facing side of a circuit element of one or more of the side lighting devices 23 in the corner regions of the window assembly 10 so as to illuminate respective side portions of the interior of the cabin of the vehicle. Optionally, the interior lighting function or feature of the lighting device of the rear slider window assembly may be directed partially downward to limit the emitted light from being directed towards the interior rearview mirror of the vehicle.

The interior cabin lighting function is part of or integrated with the rear slider window assembly 10 of the vehicle, thus reducing or eliminating the need for a separate interior cabin light and/or reading light at the headliner of the vehicle (and thus reducing or eliminating the need for a separate wiring harness to a central light of the interior cabin of the vehicle, such as within a headliner of the vehicle). The lighting device(s) of the rear slider window assembly 10 may be connected to a wiring harness that includes existing wires that electrically connect to and power the heater grid 24 of the rear slider window assembly 10. Thus, the lighting device(s) of the rear slider window assembly 10 can be powered via expansion of an existing wiring harness (to include additional wires for powering and control of the lighting devices), thereby enhancing assembly and electrical connection of the interior lighting devices at the vehicle.

Figure 8:
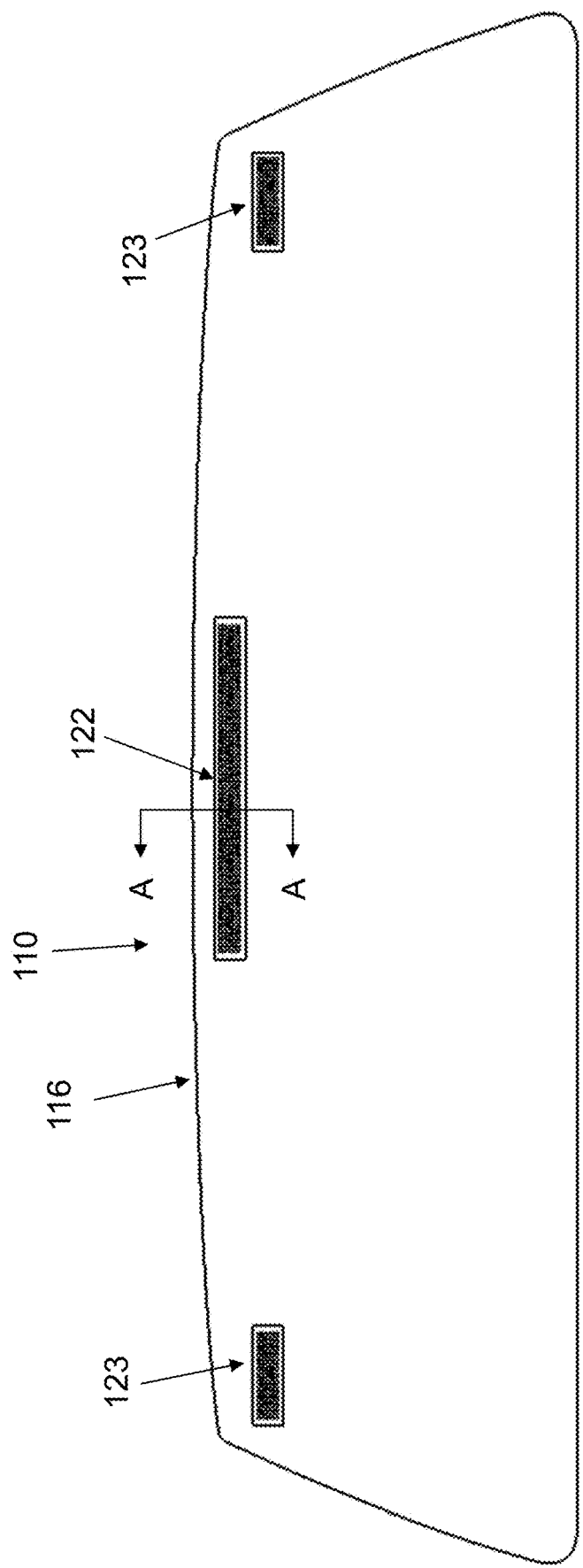
FIG. 8 is a rear plan view of the fixed window panel and lighting device of the rear window assembly.
Figure 8A:
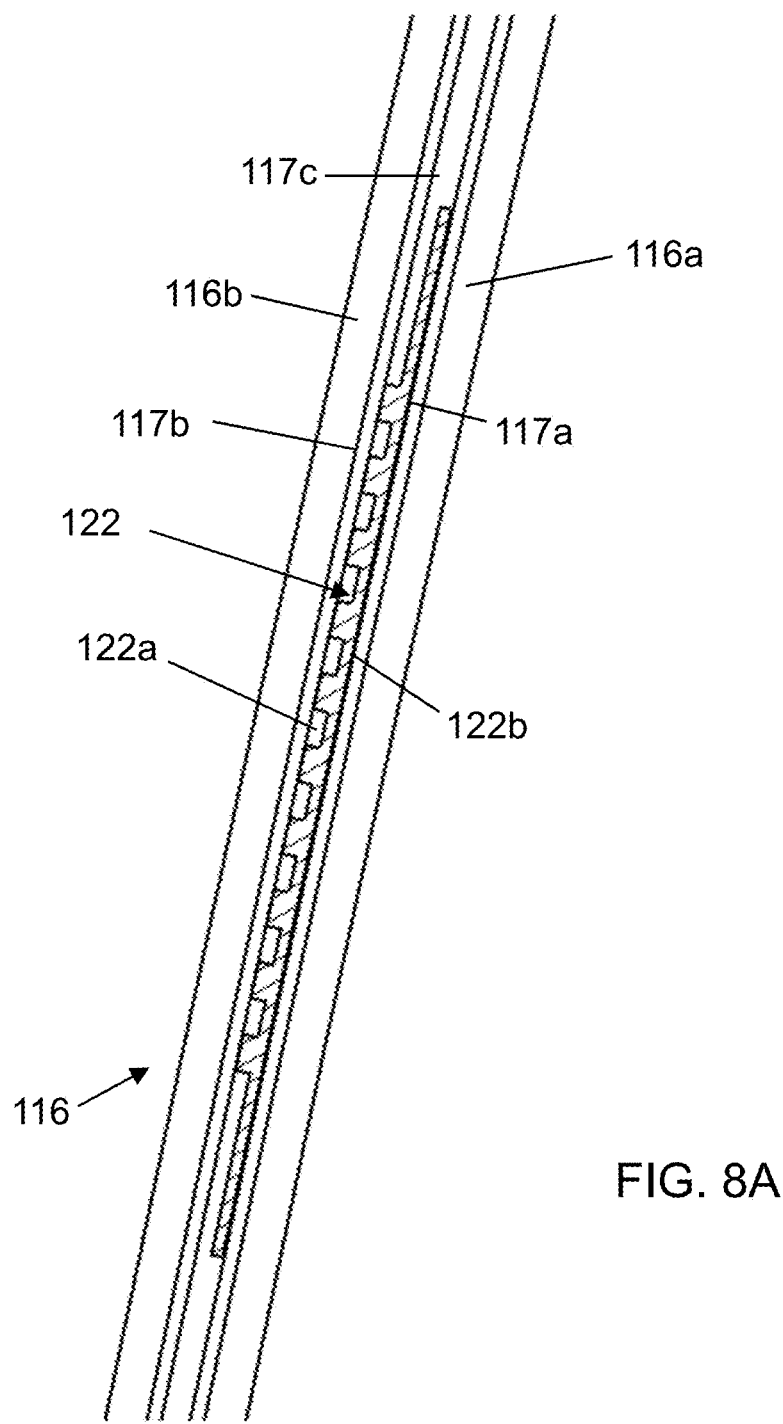
FIG. 8A is a sectional view of the fixed window panel taken along the line A-A in FIG. 8.

Optionally, the laminated window panel and lighting device construction may be implemented on a full-pane fixed (non-slider) rear window assembly. For example, and as shown in FIGS. 6-8A, a fixed full-pane window assembly 110 comprises a fixed full-pane window panel 116 for a non-slider window of a pickup truck, and the lighting devices 122, 123 are laminated between the inner glass panel 116*a* and the outer glass panel 116*b* of the window panel 116. It should be understood that the features described herein are compatible with full pane window panels installed at any type of vehicle, such as the rear windows of sedans, SUVs, busses, commercial vehicles, and the like. The lighting device 122 comprises a plurality of individual light emitting diodes 122*a* arranged in a two dimensional array of rows and columns at an upper center region of the fixed window panel 116. As shown in FIG. 8A, the laminated window panel 116 comprises the inner glass panel 116*a* and the outer glass panel 116*b*, with respective interlayers of polyvinyl butyral (PVB) 117*a*, 117*b* disposed at the inner opposing surfaces of the glass panels 116*a*, 116*b*, and with a central layer 117*c* disposed between the interlayers 117*a*, 117*b*. The individual light sources 122*a* may be arranged on a sheet 122*b* (such as a thin flexible circuit element or tape) that is disposed at or attached or adhered at the PVB layer 117*a* at the surface of the inner glass panel 116*a*, with the individual light sources 122*a* disposed between the panels 116*a*, 116*b* (and with the interlayer 117*c* conforming to the lighting device between the interlayers 117*a*, 117*b*) so that light emitted by the light sources passes through the outer glass panel 116b. The lighting device 122 may be disposed at an upper central region and/or a similar lighting device 123 may be disposed at the upper corner regions of the window panel 116, and may be at a location where one of the glass panels 116a, 116b has a non-light-transmitting layer (such as a ceramic frit layer or the like) established at a surface thereof. The window panel 116 and lighting devices 122, 123 may otherwise be similar to the window panel 16 and lighting devices 22, 23, discussed above, such that a detailed discussion of the window panels and lighting devices need not be repeated herein.

Therefore, the rear window assembly for a pickup truck has one or more lighting devices integrated therein. The rear window assembly thus has a smooth exterior appearance and avoids use of a lens on the sheet metal and an applique on the glass panel. The window assembly provides a single modular system that eliminates the need for two or more separate assemblies in the assembly plant. The window assembly provides a reduction of labor and complexity of installation at the vehicle assembly plant, and eliminates labor at the assembly plant for installing a separate center high mounted stop lamp (CHMSL). The window assembly provides environment improvement by integrating the lighting device within the fixed window panel. The window assembly is more aesthetically pleasing and provides a lower profile, or reduced thickness, window assembly with lighting, without additional brackets and housings of lighting modules attached at an exterior or interior side of the window panel. The lighting device and window assembly also reduces or substantially eliminates leak paths that often occur between traditional CHMSLs and the vehicle sheet metal.

Thus, the window assembly provides lighting within the fixed window panel to provide a flush glass window with no separate stop lamp or bed lighting at or above the window (such as at the vehicle cab or at a molding or frame of the window assembly). The lighting device is integrated within the laminated fixed window panel and has no part that protrudes from the glass or that is in any perimeter frame or molding of the window assembly or vehicle. Thus, the window assembly of the present invention allows the glass window panel to be a larger window because no frame or vehicle portion is needed above the window panel for the center high mounted stop lamp or the like. The lighting device may be powered via any suitable wiring or electrically conductive traces or busbars at the window assembly, and may be readily electrically connected to wiring or circuitry of the vehicle when the window assembly is installed at the vehicle.

The illumination sources and lighting device thus may comprise a brake light, such as for a CHMSL of the vehicle, whereby the illumination source may be activated upon actuation of the vehicle brakes. Optionally, the lighting device may comprise an illumination source or light for illuminating the bed of the pickup, such as one or more lights that are directed so as to provide white (or substantially white) light or illumination to illuminate the pickup bed, such as in response to a user input or button or switch. Optionally, the window assembly may include a first illumination source or first set of light sources for a CHMSL and may include a second illumination source or second set of light sources for another function or feature (such as for providing light to the pickup bed). Optionally, the lighting device includes light sources that emit light through a rear or outer pane or panel of the window panel exterior the vehicle and/or light sources that emit light through a front or inner pane or panel of the window panel interior the vehicle, such as to provide both a CHMSL and an interior cabin light for the vehicle. The lighting device may be laminated in the fixed window panel of a rear slider window assembly, or the lighting device of the present invention may be laminated in a fixed window panel of a full-pane fixed (non-slider) rear window assembly or the like.

The fixed window panel may include an opaque or substantially opaque perimeter coating or layer, such as a black frit layer or the like. The opaque layer may be disposed within or on the window panel in any suitable manner. For example, the opaque layer may be disposed between the inner glass panel and the outer glass panel and/or the opaque layer may be disposed on one or both of the inner glass panel and outer glass panel. When the opaque layer is disposed on one or both of the inner glass panel and the outer glass panel, the opaque layer may be disposed at the exterior or interior surface of the respective panel. In other words, the opaque layer may be disposed at the surface of the inner or outer glass panel that is adjacent the other glass panel or the opaque layer may be disposed at the surface of the inner glass panel facing the cabin of the vehicle or at the surface of the outer glass panel facing exterior the vehicle.

The lighting device may emit light that passes through the opaque coating or through apertures established through the opaque coating, or the lighting device may be positioned within the window panel at a position that is at least partially devoid of the opaque coating or layer. For example, an opaque layer may be disposed at the perimeter of the inner window panel (such as at the inner side or surface of the inner glass panel facing the interior cabin of the vehicle) and substantially circumscribe the perimeter of the inner panel except for positions corresponding to lighting devices configured to emit light through the inner glass panel to provide an interior facing or cabin illuminating light for the vehicle. At the locations corresponding to the interior facing lights, an opaque layer may be disposed at the outer glass panel (such as at the side or surface of the outer glass panel adjacent the inner glass panel) so that light emitted by the interior facing lights may pass through the inner glass panel at positions devoid of the opaque layer while the entire perimeter of the fixed window panel appears to have the opaque layer disposed thereat. In other words, from exterior the vehicle, it appears as if an opaque layer is disposed around the entirety of the fixed window panel and, from the interior of the vehicle when the interior facing lights are not emitting light, it also appears as if the opaque layer is disposed around the entirety of the fixed window panel.

Optionally, a lighting device may be located at or near an outer corner of the window assembly, such as to provide a turn signal indicator or pickup bed illumination or the like at the outer ends or sides of the window assembly. For example, a turn signal indicator (comprising one or more orange or amber colored light sources or LEDs or the like) may be disposed at the upper corners of the window panel (or the lower corners). The turn signal indicator may be located at and behind the opaque layer (and optionally a window or non-opaque region may be established at the turn signal indicator). For example, the light sources may be arranged or energized in an arrow-shape or chevron-shape, or an arrow-shaped or chevron-shaped or triangular-shaped window or aperture may be established through an opaque region of the window and generally at the turn signal indicator, such that, when the indicator is activated, the light is emitted through the arrow-shaped (or otherwise shaped) window to provide the turn signal direction to a person viewing the rear window assembly from exterior and rearward/sideward of the vehicle. Optionally, the turn signal indicators may be disposed elsewhere at the window assembly (and laminated within the fixed window panel), such as at the upper region of the window panel, with the arrow-shaped apertures or masks providing the directional information for the indicators. Optionally, the directional information may be conveyed by the location of the light sources and/or by serial activation of the light sources from one end of the strip to the other.

The movable or slider window panel may be movable such as via manual pushing or pulling at the window panel and preferably is movable in response to actuation of a drive motor of the drive motor assembly or system, which may move cables or wires of cable assemblies relative to the sheath of the cable assemblies to impart horizontal movement of the carrier and slider window panel along the upper and lower rails. Optionally, the drive motor assembly and rail configurations may utilize aspects of the drive assemblies of the types described in U.S. Pat. Nos. 4,920,698; 4,995,195; 5,146,712; 5,531,046; 5,572,376; 6,955,009; 7,073,293; 8,151,519 and/or 8,938,914, and/or U.S. Publication Nos. US-2019-0383084; US-2017-0356231; US-2004-0020131 and/or US-2008-0127563, and/or U.S. patent application Ser. No. 17/305,818, filed Aug. 10, 2021, which are all hereby incorporated herein by reference in their entireties.

Optionally, the fixed window panel or panels may include an electrically conductive heater grid or other heating element or electrically operable element established at the window panel or panels (such as at or on an interior surface of the window panel) and the movable window panel may include an electrically conductive heater grid or other heating element or electrically operable element established at the movable window panel (such as at or on an interior surface of the movable window panel). Optionally, the heater grids may also be laminated within the fixed window panel and/or the movable window panel, such as by utilizing aspects of the window assemblies described in U.S. Pat. No. 10,524,313, which is hereby incorporated herein by reference in its entirety. The heater grids are electrically conductively connected to (or are otherwise in electrical conductive continuity with) a power source of the vehicle and may be powered (such as responsive to a user actuatable input or switch or button of the vehicle or responsive to a sensor or accessory of the vehicle) to heat or defrost or defog the fixed window panels. The movable panel heater grid is electrically connected to the power source (and may be electrically connected to electrical terminals or elements at one of the heater grids of the fixed window panels) and may be electrically powered to heat or defrost or defog the movable window panel. The heater grids comprise a plurality of electrically conductive traces that extend across the respective window panels between respective busbars (see FIG. 2) to provide enhanced and more uniform heating and defrosting/defogging of the window panel. The heater grid of the movable window panel may be powered in a manner that allows for heating or defogging or defrosting of the movable window panel irrespective of whether the movable window panel is opened or partially opened or closed. For example, the electrical connections may be made via a flexible electrical connector or wire or cable or the like, such as by utilizing aspects of the rear slider window assemblies described in U.S. Pat. Nos. 9,579,955, 8,938,914, 8,881,458 and/or 8,402,695, and/or U.S. Publication No. US-2018-0079379, which are hereby incorporated herein by reference in their entireties. Optionally, the heater grid of the movable window panel may be powered only when in its closed position and/or via any suitable powering means. Optionally, a laminated lighting device may be integrated in the movable sliding window panel 20 and electrically powered via similar or shared electrical connection as that used to electrically power the heater grid of the movable window panel, such as a flexible or sliding electrical connector.

The benefits of embodiments of the present invention may also be realized in vehicular movable window assemblies other than a rear window assembly for a pickup truck or the like, such as (for example) a slider window assembly suitable for use as a movable side window for a vehicle such as a van or a bus or other vehicular window assembly. The laminated window construction with lighting device laminated therein may provide brake lighting, cargo lighting and/or interior lighting, and/or may provide other exterior lighting, such as puddle lamps or the like, via light sources (such as LEDs, micro-LEDs, OLEDs or electro-luminescent light sources or the like) that are laminated into a fixed or movable glass window panel of a vehicle, such as for a rear window or rear liftgate or side window or other window of a vehicle.

Optionally, the window assembly or assemblies of the present invention may utilize aspects of the window assemblies described in U.S. Pat. Nos. 8,915,018; 8,881,458; 8,402,695; 7,073,293; 7,003,916; 6,119,401; 6,026,611; 5,996,284; 5,799,444 and/or 6,691,464, and/or U.S. Publication Nos. US-2014-0047772; US-2006-0107600; US-2008-0127563; US-2004-0020131 and/or US-2003-0213179, all of which are hereby incorporated herein by reference in their entireties.

Changes and modifications to the specifically described embodiments may be carried out without departing from the principles of the present invention, which is intended to be limited only by the scope of the appended claims, as interpreted according to the principles of patent law.

The invention claimed is:

1. A vehicular rear window assembly comprising:
   a window panel comprising an inner glass panel and an outer glass panel laminated together;
   a lighting device comprising a plurality of light sources arranged on a circuit element, wherein the plurality of light sources comprises (i) a plurality of first light sources arranged on a first side of the circuit element, and (ii) a plurality of second light sources arranged on a second side of the circuit element opposite the first side;
   wherein the vehicular rear window assembly is configured to be disposed at a rear portion of a cabin of a vehicle, and wherein, with the vehicular rear window assembly disposed at the rear portion of the cabin of the vehicle, the inner glass panel is toward the cabin of the vehicle and the outer glass panel is exterior of the vehicle;
   wherein the lighting device is disposed between the inner glass panel and the outer glass panel, and wherein the first side of the circuit element faces the outer glass panel and the second side of the circuit element faces the inner glass panel;
   wherein the first side of the circuit element is between the second side of the circuit element and the outer glass panel, and wherein the second side of the circuit element is between the first side of the circuit element and the inner glass panel;
   wherein the circuit element is between the plurality of first light sources and the plurality of second light sources;
   wherein the plurality of first light sources, when electrically powered, emit light that is visible through the outer glass panel of the window panel so as to be viewable by a person viewing the vehicular rear window assembly from exterior and rearward of the vehicle;

wherein the plurality of second light sources, when electrically powered, emit light that is visible through the inner glass panel of the window panel so as to illuminate at least a portion of the cabin of the vehicle; and wherein the lighting device is disposed within the window panel at an upper region of the window panel, and wherein at least some light sources of the plurality of first light sources of the lighting device are electrically powered responsive to actuation of a user actuatable input of the vehicle.

2. The vehicular rear window assembly of claim 1, wherein the plurality of light sources comprise one selected from the group consisting of (i) a plurality of light emitting diodes (LEDs), (ii) a plurality of organic light emitting diodes (OLEDs), and (iii) a plurality of electro-luminescent light sources.

3. The vehicular rear window assembly of claim 1, wherein the plurality of light sources comprise a plurality of micro LEDs.

4. The vehicular rear window assembly of claim 1, wherein an inner polyvinyl butyral (PVB) interlayer is at a side of the inner glass panel that opposes a side of the outer glass panel, and wherein an outer PVB interlayer is at the side of the outer glass panel that opposes the side of the inner glass panel, and wherein the circuit element and light sources are disposed between the inner and outer PVB interlayers.

5. The vehicular rear window assembly of claim 1, wherein the lighting device is operable as an exterior illumination device of the vehicle, and wherein, with the vehicular rear window assembly disposed at the rear portion of the cabin of the vehicle, and when the lighting device is electrically powered responsive to actuation of the user actuatable input, some light sources of the plurality of first light sources emit white light that passes through the outer glass panel of the window panel and that is directed at least in part downwardly so as to illuminate a rear exterior portion of the vehicle.

6. The vehicular rear window assembly of claim 1, wherein at least some light sources of the plurality of first light sources of the lighting device are electrically powered responsive to actuation of a brake of the vehicle so as to provide a center high mounted stop lamp feature that is integrated within the window panel.

7. The vehicular rear window assembly of claim 6, further comprising an exterior lighting device disposed between the inner glass panel and the outer glass panel at an upper corner region of the window panel, wherein, with the vehicular rear window assembly disposed at the rear portion of the cabin of the vehicle, and when the exterior lighting device is electrically powered responsive to actuation of another user actuatable input, light sources of the exterior lighting device emit white light that passes through the outer glass panel of the window panel and that is directed at least in part downwardly so as to illuminate a rear exterior portion of the vehicle.

8. The vehicular rear window assembly of claim 6, further comprising turn signal indicating lighting devices disposed between the inner glass panel and the outer glass panel at upper regions of the window panel, wherein, with the vehicular rear window assembly disposed at the rear portion of the cabin of the vehicle, and when the turn signal indicating lighting devices are electrically powered responsive to actuation of a turn signal of the vehicle, light sources of the turn signal indicating lighting devices emit light that passes through the outer glass panel of the window panel to indicate actuation of the turn signal to a person viewing the vehicular rear window assembly from rearward of the vehicle.

9. The vehicular rear window assembly of claim 1, wherein, with the vehicular rear window assembly disposed at the rear portion of the cabin of the vehicle, at least some light sources of the plurality of second light sources of the lighting device are electrically powered responsive to actuation of another user actuatable input, and wherein the plurality of second light sources, when electrically powered, emit white light.

10. The vehicular rear window assembly of claim 1, further comprising respective interior lighting devices disposed between the inner glass panel and the outer glass panel and at upper corner regions of the window panel, wherein the respective interior lighting devices, when electrically powered, emit light that passes through the inner glass panel to illuminate respective side portions of the cabin of the vehicle.

11. The vehicular rear window assembly of claim 1, further comprising an interior lighting device disposed between the inner glass panel and the outer glass panel and positioned along a perimeter region of the window panel, wherein the window panel comprises an opaque layer at the perimeter region of the window panel, and wherein the opaque layer is disposed (i) at a side of the inner glass panel along the perimeter region of the window panel except at the position corresponding to the position of the interior lighting device and (ii) at a side of the outer glass panel along the perimeter region of the window panel at the position corresponding to the position of the interior lighting device.

12. The vehicular rear window assembly of claim 1, wherein the vehicular rear window assembly is configured to be disposed at a rear portion of a cabin of a pickup truck.

13. The vehicular rear window assembly of claim 12, wherein the vehicular rear window assembly comprises a vehicular rear slider window assembly comprising a movable window panel and a frame portion having an upper rail and a lower rail, and wherein the window panel is fixed relative to the frame portion, and wherein the window panel comprises an opening, and wherein the movable window panel is movable along the upper rail and the lower rail, and wherein the movable window panel is movable between a closed position, where the movable window panel is disposed at the opening, and an opened position, where the movable window panel is disposed at least partially along the window panel, and wherein the lighting device is disposed along an upper region of the window panel and above the opening.

14. The vehicular rear window assembly of claim 1, wherein the window panel comprises an opaque layer at a perimeter region of the window panel.

15. The vehicular rear window assembly of claim 14, wherein the lighting device is positioned within the window panel at a position of the window panel that is at least partially devoid of the opaque layer.

16. The vehicular rear window assembly of claim 15, wherein the plurality of light sources are each positioned at a respective portion of the window panel that is devoid of the opaque layer.

17. The vehicular rear window assembly of claim 14, wherein the opaque layer is disposed at a surface of either the inner glass panel or the outer glass panel.

18. The vehicular rear window assembly of claim 1, wherein, with the vehicular rear window assembly disposed at the rear portion of the cabin of the vehicle, the lighting device is electrically connected to a wiring harness of the vehicle.

19. The vehicular rear window assembly of claim 18, further comprising a heater grid disposed at the window panel, and wherein, with the vehicular rear window assembly disposed at the rear portion of the cabin of the vehicle, the lighting device and the heater grid are electrically connected to the wiring harness of the vehicle via a common connector.

20. A vehicular rear window assembly comprising:
a window panel comprising an inner glass panel and an outer glass panel laminated together;
a lighting device comprising a plurality of light sources arranged on a circuit element, wherein the plurality of light sources comprises (i) a plurality of first light sources arranged on a first side of the circuit element, and (ii) a plurality of second light sources arranged on a second side of the circuit element opposite the first side;
wherein the vehicular rear window assembly is configured to be disposed at a rear portion of a cabin of a vehicle, and wherein, with the vehicular rear window assembly disposed at the rear portion of the cabin of the vehicle, the inner glass panel is toward the cabin of the vehicle and the outer glass panel is exterior of the vehicle;
wherein the lighting device is disposed between the inner glass panel and the outer glass panel, and wherein the first side of the circuit element faces the outer glass panel and the second side of the circuit element faces the inner glass panel;
wherein the first side of the circuit element is between the second side of the circuit element and the outer glass panel, and wherein the second side of the circuit element is between the first side of the circuit element and the inner glass panel;
wherein the circuit element is between the plurality of first light sources and the plurality of second light sources;
wherein the plurality of first light sources, when electrically powered, emit light that is visible through the outer glass panel of the window panel so as to be viewable by a person viewing the vehicular rear window assembly from exterior and rearward of the vehicle;
wherein the plurality of second light sources, when electrically powered, emit light that is visible through the inner glass panel of the window panel so as to illuminate at least a portion of the cabin of the vehicle; and
wherein the lighting device is disposed within the window panel at an upper region of the window panel, and wherein at least some light sources of the plurality of second light sources of the lighting device are electrically powered responsive to actuation of a user actuatable input of the vehicle.

21. The vehicular rear window assembly of claim 20, wherein the plurality of light sources comprise one selected from the group consisting of (i) a plurality of light emitting diodes (LEDs), (ii) a plurality of micro-LEDs, (iii) a plurality of organic light emitting diodes (OLEDs), and (iii) a plurality of electro-luminescent light sources.

22. The vehicular rear window assembly of claim 20, wherein an outer polyvinyl butyral (PVB) interlayer is at a side of the outer glass panel that opposes a side of the inner glass panel, and wherein an inner PVB interlayer is at the side of the inner glass panel that opposes the side of the outer glass panel, and wherein the circuit element and light sources are disposed between the inner and outer PVB interlayers.

23. The vehicular rear window assembly of claim 20, wherein the lighting device comprises respective lighting devices disposed at upper corner regions of the window panel to illuminate respective side portions of the cabin of the vehicle.

24. The vehicular rear window assembly of claim 20, wherein the vehicular rear window assembly is configured to be disposed at a rear portion of a cabin of a pickup truck.

25. The vehicular rear window assembly of claim 20, wherein the window panel comprises an opaque layer at a perimeter region of the window panel, and wherein the lighting device is positioned within the window panel at a position of the window panel that is at least partially devoid of the opaque layer.

26. The vehicular rear window assembly of claim 20, wherein, with the vehicular rear window assembly disposed at the rear portion of the cabin of the vehicle, the lighting device is electrically connected to a wiring harness of the vehicle.

27. A method of manufacturing a vehicular rear window assembly, the method comprising:
providing an inner glass panel, an outer glass panel, and a lighting device comprising a plurality of light sources arranged on a circuit element, wherein the plurality of light sources comprises (i) a plurality of first light sources arranged on a first side of the circuit element, and (ii) a plurality of second light sources arranged on a second side of the circuit element opposite the first side;
wherein the circuit element is between the plurality of first light sources and the plurality of second light sources;
disposing an opaque layer at a surface of at least one selected from the group consisting of the inner glass panel and the outer glass panel along a perimeter region of the at least one selected from the group consisting of the inner glass panel and the outer glass panel;
forming a window panel by laminating the inner glass panel to the outer glass panel with the lighting device disposed between the inner glass panel and the outer glass panel, wherein, with the lighting device disposed between the inner glass panel and the outer glass panel, the first side of the circuit element faces the outer glass panel and the second side of the circuit element faces the inner glass panel;
wherein, with the lighting device disposed between the inner glass panel and the outer glass panel, the first side of the circuit element is between the second side of the circuit element and the outer glass panel, and wherein the second side of the circuit element is between the first side of the circuit element and the inner glass panel;
wherein the vehicular rear window assembly is configured to be disposed at a rear portion of a cabin of a vehicle, and wherein, with the vehicular rear window assembly disposed at the rear portion of the cabin of the vehicle, the inner glass panel of the window panel is toward the cabin of the vehicle and the outer glass panel of the window panel is exterior of the vehicle;
wherein the lighting device is configured to be electrically connected to a wiring harness of the vehicle when the vehicular rear window assembly is disposed at the rear portion of the cabin of the vehicle;
wherein, with the vehicular rear window assembly disposed at the rear portion of the cabin of the vehicle, the plurality of first light sources, when electrically powered, emit light that is visible through the outer glass panel of the window panel so as to be viewable by a person viewing the vehicular rear window assembly from exterior and rearward of the vehicle; and wherein, with the vehicular rear window assembly disposed at the rear portion of the cabin of the vehicle, the plurality of second light sources, when electrically powered, emit light that is visible through the inner glass panel of the window panel so as to illuminate at least a portion of the cabin of the vehicle.

28. The method of claim 27, further comprising (i) disposing an inner polyvinyl butyral (PVB) interlayer at a side of the inner glass panel configured to oppose a side of the outer glass panel and (ii) disposing an outer PVB interlayer at the side of the outer glass panel that opposes the side of the inner glass panel, wherein, with the inner glass panel laminated to the outer glass panel, the lighting device is disposed between the inner and outer PVB interlayers.

29. The method of claim 27, wherein the opaque layer is (i) disposed at a side of the inner glass panel along the perimeter region of the window panel except at the position corresponding to the position of the lighting device and (ii) disposed at a side of the outer glass panel along the perimeter region of the window panel except at the position corresponding to the position of the lighting device.

30. The method of claim 27, wherein the individual light sources of the plurality of light sources are positioned at respective portions of the window panel that are devoid of the opaque layer.

\* \* \* \* \*